United States Patent [19]

Sellers

[11] Patent Number: 5,209,013
[45] Date of Patent: May 11, 1993

[54] POTTED PLANT SUPPORT

[76] Inventor: Kathleen R. Sellers, 5104 Coronado Ridge, Boca Raton, Fla. 33486

[21] Appl. No.: 704,265

[22] Filed: May 22, 1991

Related U.S. Application Data

[63] Continuation-in-part of Ser. No. 627,223, Dec. 12, 1990.

[51] Int. Cl.$^5$ ............................................. A47G 7/02
[52] U.S. Cl. ................................... 47/71; 248/346.1; 47/39
[58] Field of Search ........................... 47/71, 81, 39; 248/346.1

[56] References Cited

U.S. PATENT DOCUMENTS

| | | | |
|---|---|---|---|
| 2,057,972 | 10/1936 | Pieck | 47/71 |
| 2,206,694 | 7/1940 | Greene | 47/71 |
| 2,989,205 | 6/1961 | Yaws | 47/71 |
| 4,833,823 | 5/1989 | Edwards | 248/346.1 |
| 4,860,491 | 8/1989 | Panuski | 47/71 |

FOREIGN PATENT DOCUMENTS

| | | | |
|---|---|---|---|
| 151495 | 2/1952 | Australia | 248/346.1 |
| 472476 | 4/1914 | France | 47/71 |
| 471172 | 10/1914 | France | 47/71 |

*Primary Examiner*—Richard E. Chilcot, Jr.
*Assistant Examiner*—Joanne C. Downs
*Attorney, Agent, or Firm*—Malin, Haley, DiMaggio & Crosby

[57] ABSTRACT

A rigid planar support for an individual potted plant which preserves carpet pile preventing matting, permanent carpet crush and stains. The plant pot support is comprised of a molded plastic disk having a plurality of strategically shaped, sized and located support legs which are semi-circular cavities vertically and arcuate shaped horizontally to provide maximum possible weight distribution and weight support for a heavy potted plant while distributing the weight on the support legs to minimize the pressure on the carpet pile and jute backing of carpet. The plastic material is waterproof to prevent moisture from passing through the disk to the carpet from the plant pot.

5 Claims, 2 Drawing Sheets

POTTED PLANT SUPPORT

This application is a continuation-in-part of U.S. patent application Ser. No. 07/627,223 filed Dec. 12, 1990 by the Applicant.

BACKGROUND OF THE INVENTION

1. Field of the Invention

This invention relates generally to an apparatus for supporting a potted plant, and more specifically, to an apparatus for supporting a potted plant on a carpeted floor to reduce or prevent flattening, crushing or soiling of the carpet pile.

2. Description of the Prior Art

Indoor potted plants have a tendency to degrade or destroy a carpeted surface when the plant pot is mounted directly on the carpet. The plant pot usually contains a flat bottom surface or is mounted on a flat dish. When the full weight of the plant and pot are put on the carpet, the carpet pile crushes under the load resulting in unsightly carpet surface undulations and permanent indentations. Moreover, water may condense on the pot exterior or egrees from bleed holes in the bottom of the pot or overflowing water from a pot saucer can seep into the carpet causing mildew and further carpet damage consequently. There is a substantial likelihood that even after the plant pot is removed, the crushed and mildew infested carpet will not be fully restorable.

In U.S. Pat. No. 4,833,823 issue to Edwards on May 30, 1989, there is disclosed a plant pot support which addresses the aforementioned concerns. The Edward's patent is a vacuum formed support comprising a planar base and a plurality of conical support members. The conical support members act to uniformly distribute the load of a potted plant resting on the planar base such that the carpet will not be crushed under the weight of the plant. The support members also serve to elevate the pot above the upper surface of the carpet, thus creating an air lap therebetween allowing ventilation which limits water seepage and prevents mildew accumulation. The planar base also comprises molded structural ribs which are integrally molded into the planar base lower surface to prevent plate buckling under load.

The Edward's invention has disadvantages in that the conical support members have the tendency to distribute the load over such a small area, that the supports could damage jute backing on carpet, clearly observable when the plant pot and accompanying support structure are relocated. Thus, the problem of providing a uniform weight distribution with no carpet jute degradation still exists and remains to be addressed.

The present invention addresses this concern by providing a plant pot support which utilizes strategically located, sized and shaped leg supports to optimize the load distribution of a potted plant in such a way as to minimize damage to the carpet by creating more surface area on the legs depending upon how heavy the plant is. Also the supports produce less pressure on the jute backing preventing damage to the jute. Finally an "air buffer" between the carpet pile and the pot is created to permit evaporation.

SUMMARY OF THE INVENTION

The present invention is a molded plant pot support which comprises a rigid planar base member such as a circular flat disk which has a plurality of integral semi-circular and arcuate leg support members protruding on one side of the disk. The assembly is amendable to various plastic fabricating processes, such as vacuum forming compression molding, or injection molding. The planar member has a flat upper peripheral surface upon which a potted plant is mounted. Semi-circular (invertical cross-section) and arcuate (horizontally) support members extends normal to the planar member's lower peripheral surface in an optimal geometric arrangement which uniformally distributes the full weight of the potted plant in such a way that damage to the carpet is minimized.

Because the semi-circular, arcuate support members have large bearing surfaces, the weight is distributed across more surface area than in the Edward's U.S. Pat. No. 4,833,823 discussed above, thus eliminating the problem of multiple hole-shaped surface undulations. Another distinguishing feature of the instant invention is the structural integrity the semi-circular and arcuate support members lend to the planar base member. Each leg support acts as a small beam which imparts substantial stiffness to the overall assembly eliminating any potential buckling of the planar base member and any requirement for superfluous stiffening members such as the structural wings in the Edward's patent which can only add additional weight and complexity.

It is an object of the invention to provide a potted plant support which eliminates carpet damage caused by matting, crushing and water seepage stains.

It is a further object of the invention to provide a simple, efficient light weight and a low cost potted plant support that is convenient for home or commercial use.

It is a further object of the invention to provide a potted plant support that is amendable to low cost and high rate production.

The invention will best be understood when the aforementioned is addressed in conjunction with the hereinafter detailed component description and drawings.

DETAILED DESCRIPTION OF THE PREFERRED EMBODIMENT

Figure 1:
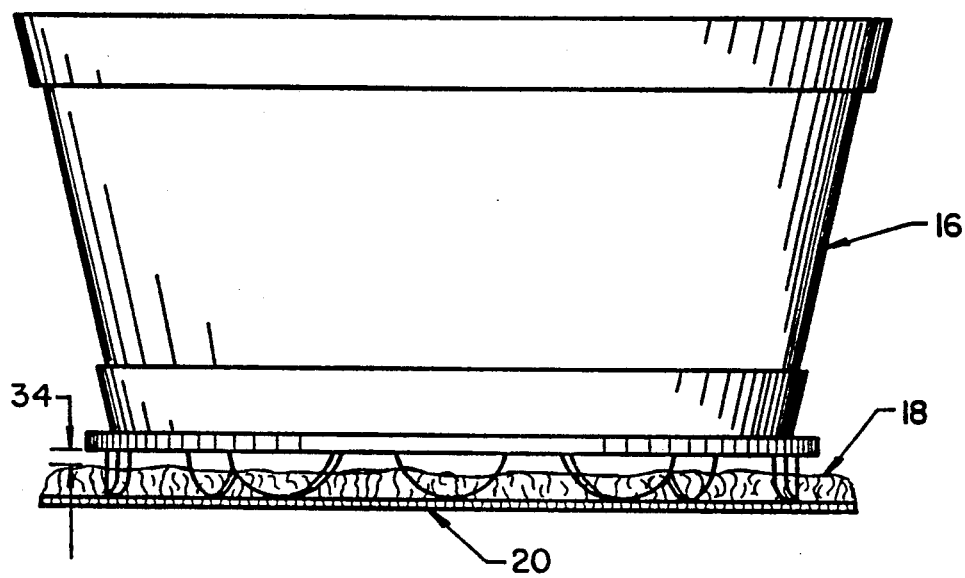
FIG. 1 is an elevational view of the present invention resting on a carpeted surface with a plant pot in phantom.

With reference to the several views of the drawing, there is depicted a potted plant pot support 10 in accordance with the invention comprising a planar base member 14 and a plurality of support members 12.

Figure 2:
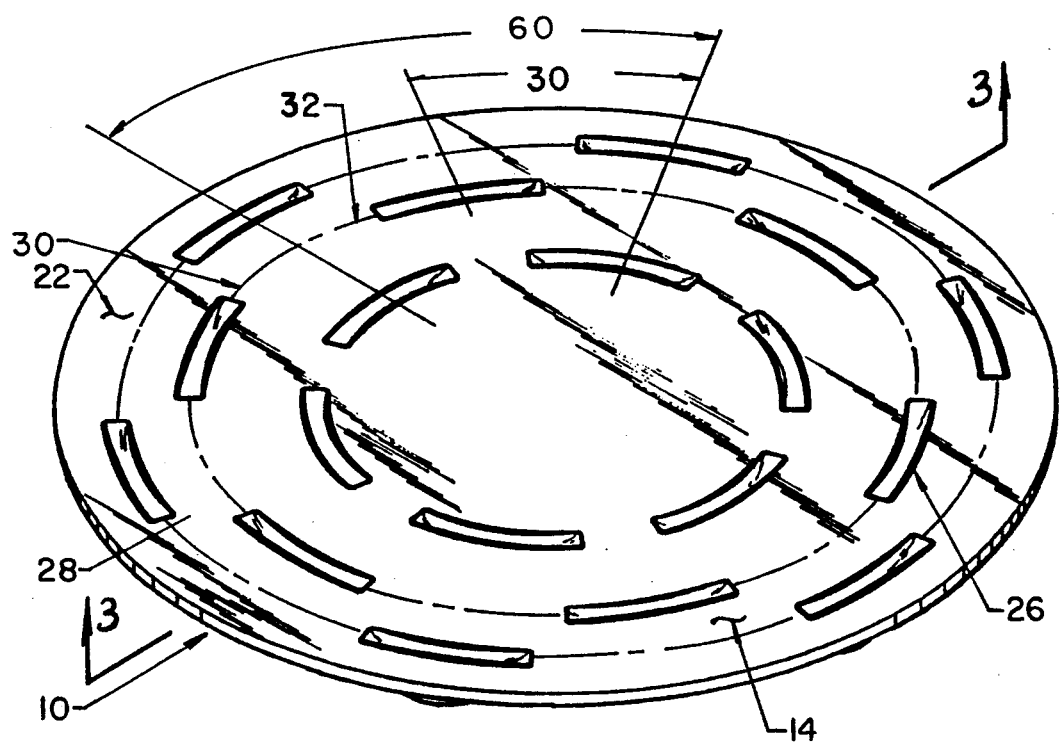
FIG. 2 is a top perspective view of the invention.
Figure 3:
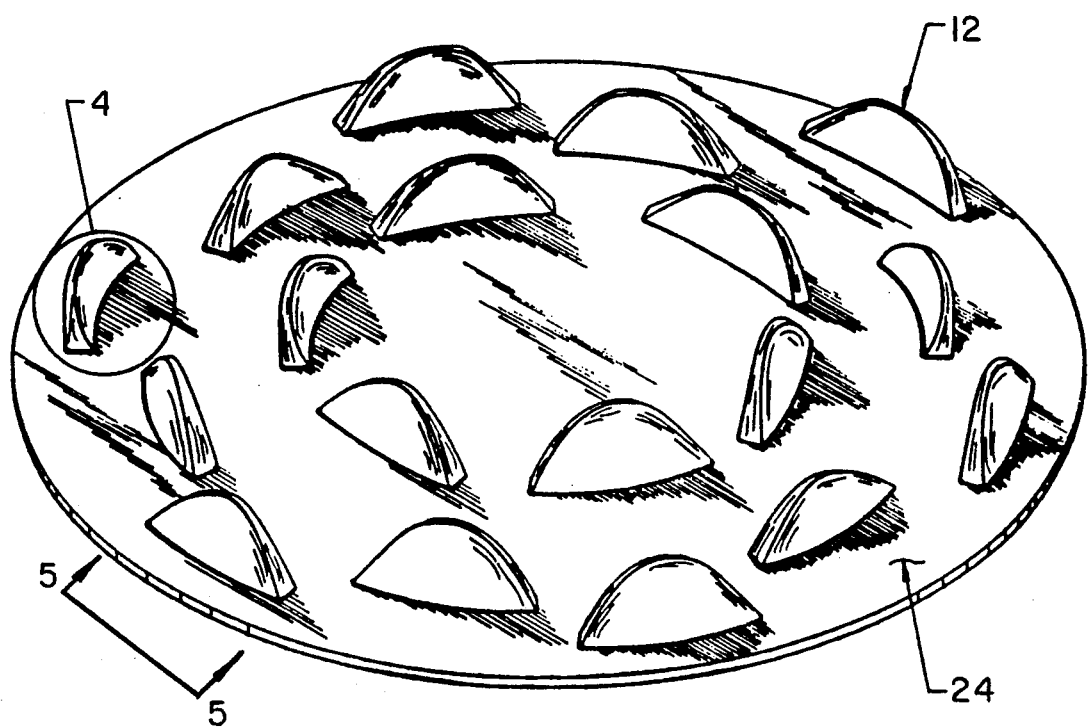
FIG. 3 is a bottom perspective view of the invention including the leg support members.
Figure 4:
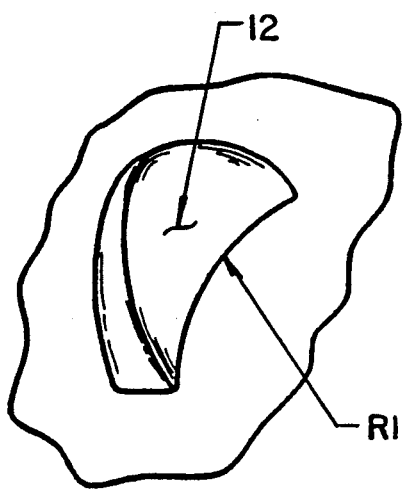
FIG. 4 is a perspective view of a leg support member (inverted for clarity).
Figure 5:
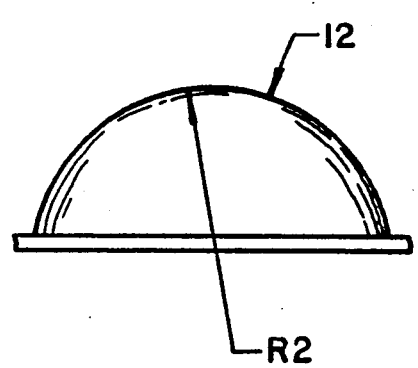
FIG. 5 is an elevational view of a leg support member (inverted for clarity).

FIGS 2 and 3 depict a circular disk-shaped planar base member 14 having an upper peripheral surface 22 and lower peripheral surface 24. The planar base member 14 has a plurality of integrally molded semi-circular arcuate support members 12 which protrude from the lower peripheral surface 24. Each support member 12 is a cavity of semi-circular shape radius R2 when viewed normal (vertical) to the plane formed by the disk-shaped member and is slightly arcuate having radius R1 as it projects normal to the planar base member lower peripheral surface 24. The support member 12 are oriented circumferentially in three (3) radial rows at an outer 28, intermediate 30, and inner 32 radius. Each row has six (6) support members 12 oriented at 60° radials relative to each other. As depicted FIGS. 2 and 3, the intermediate row 30 and inner 32 radial rows contain support members 12 which are oriented on coincident 60° radials. These radials are offset by 30° from the outer radial row 28 support member radials. Since the support members 12 are integrally molded with the planar base member 14, each support member 12 defines a cavity 26 when the planar base member 14 is viewed looking toward its upper peripheral surface 22.

The support members 12 serve several important functions. The semicircular and arcuate geometry effectuate optimal weight distribution on a carpet pile 18 when a potted plant 16 is placed on the planar base member upper peripheral surface 22, as shown in FIG. 1. Each support member 12 spreads the load over a large surface area which helps to minimize permanent carpet jute damage. The support members 12 further function as small beams which impart structural rigidity to the planar base member 14 thus precluding any buckling under the weight of a potted plant which would otherwise require additional structural supports which add weight and complexity. The support members 12 are constructed of sufficient length that when they bear on the floor surface 20, the planar base member 14 and accompanying potted plant 16 are elevated to form an air gap 34 between the planar base member lower peripheral surface 24 and the carpet pile 18. The air gap 34 helps prevent mildew formation caused water seepage or condensation in the carpet pile 18 by providing ventilation below the planar base member lower peripheral surface 24 and above the carpet pile even if a spill occurs—evaporation can take place and water is not trapped between the planter and floor surface 18. Moreover, the support member cavities 26 function as overflow traps which help to minimize carpet pile water seepage resulting from over filling the plant pot 16. It is important to note that the plant pot support 10 may be manufactured by employing various molding methods such as injection molding, compression molding or vacuum forming techniques from polystyrene, polyethylene or other similar plastic.

The invention described herein has been shown in what is considered the most practical embodiment. It is anticipated that departures may be made therefrom within the scope of the invention and that obvious modifications will be implemented by a person skilled in the art.

What I claim is:

1. An apparatus for supporting a plant pot on a carpeted floor surface having a pile comprising:
    a rigid planar member having an upper and lower peripheral surface forming a common outer perimeter and a center point; and
    a plurality of hollow, semi-circular, independent support feet, each foot having a pair of curved wall surfaces, each wall radially spaced from each other and concavely shaped relative to the center of said planar member, each foot tapered in vertical thickness, protruding normal to said planar member lower peripheral surface, said support feet circumferentially disposed along radials extending outward from said planar member center to predetermined positions inward of said outer perimeter, said support feet acting to minimize said planar member buckling and extending into said carpet pile to uniformly distribute the weight of said plant pot resting on said planar member upper peripheral surface thereby preventing carpet pile crushing under load, said support feet furthermore constructed of equal length sufficient to elevate said planar member and plant pot into a position above said carpet pile surface, thus creating air space which prevents carpet pile degradation from water seepage, condensation stains, mildew, and dirt.

2. The apparatus recited in claim 1, wherein said support members number a total of eighteen (18) which are circumferentially disposed, six (6) along an outer circumference at 60° radial intervals, and six (6) each along an intermediate and inner circumference respectively wherein the support members are mounted along coincident 60° radials which are 30° out of phase with said outer circumference support radials.

3. The apparatus recited in claim 1 wherein said planar member is disk-shaped.

4. The apparatus recited in claim 1 wherein said support feet are integrally molded parts of said planar member.

5. A plant pot support as in claim 1, wherein:
    said support feet are integrally molded cavities in said planar member.

* * * * *